US009511656B2

(12) United States Patent
Muto et al.

(10) Patent No.: US 9,511,656 B2
(45) Date of Patent: Dec. 6, 2016

(54) INVERTED PENDULUM TYPE VEHICLE

(71) Applicant: HONDA MOTOR CO., LTD., Tokyo (JP)

(72) Inventors: Yusuke Muto, Wako (JP); Wataru Yada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 14/244,279

(22) Filed: Apr. 3, 2014

(65) Prior Publication Data

US 2014/0353052 A1 Dec. 4, 2014

(30) Foreign Application Priority Data

May 31, 2013 (JP) ................................. 2013-115730

(51) Int. Cl.
| | |
|---|---|
| *B62K 1/00* | (2006.01) |
| *B62K 3/00* | (2006.01) |
| *B60K 1/02* | (2006.01) |

(52) U.S. Cl.
CPC . *B60K 1/02* (2013.01); *B62K 1/00* (2013.01); *B62K 3/007* (2013.01)

(58) Field of Classification Search
CPC ...... B60B 19/12; B60B 19/003; B60B 19/006; B62K 1/00; B62K 3/007; B62K 1/02; B62K 17/00; B62H 1/00; B62H 1/02; B62H 7/00
See application file for complete search history.

(56) References Cited

U.S. PATENT DOCUMENTS

| | | | |
|---|---|---|---|
| 5,385,210 A | * | 1/1995 | Harvey ................. A63C 11/10 180/11 |
| 5,791,425 A | | 8/1998 | Kamen et al. |
| 5,971,091 A | | 10/1999 | Kamen et al. |
| 6,302,230 B1 | | 10/2001 | Kamen et al. |
| 6,827,163 B2 | | 12/2004 | Amsbury et al. |
| 6,840,346 B2 | | 1/2005 | Sugitani et al. |
| 7,690,452 B2 | | 4/2010 | Kamen et al. |
| 7,740,099 B2 | | 6/2010 | Field et al. |

(Continued)

FOREIGN PATENT DOCUMENTS

| | | |
|---|---|---|
| DE | 20 2007 007 673 U1 | 10/2007 |
| EP | 1 529 556 A2 | 5/2005 |

(Continued)

OTHER PUBLICATIONS

Extended European Search Report for Application 14169797.9 dated Oct. 7, 2014.

(Continued)

*Primary Examiner* — Paul N Dickson
*Assistant Examiner* — Daniel Yeagley
(74) *Attorney, Agent, or Firm* — Birch, Stewart, Kolasch & Birch, LLP

(57) ABSTRACT

To suppress the height of a vehicle body frame of an inverted pendulum type vehicle in consideration of mounting and dismounting the vehicle. Left and right drive units are disposed so as to be juxtaposed in the left-right direction at same-height positions higher than a main wheel. The left and right drive units and a battery pack are disposed so as to be juxtaposed in front and behind a vehicle body frame.

18 Claims, 7 Drawing Sheets

(56) References Cited

U.S. PATENT DOCUMENTS

| | | | |
|---|---|---|---|
| 7,963,352 B2* | 6/2011 | Alexander | B62K 3/007 180/21 |
| 8,050,837 B2 | 11/2011 | Yamada | |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 | 9/2013 | Gomi et al. | |
| 8,583,302 B2 | 11/2013 | Akimoto et al. | |
| 8,751,110 B2 | 6/2014 | Takenaka et al. | |
| 8,758,191 B2 | 6/2014 | Takenaka et al. | |
| 9,037,331 B2 | 5/2015 | Taira et al. | |
| 9,085,334 B2* | 7/2015 | Hoffmann | B62K 3/007 |
| 2001/0032743 A1 | 10/2001 | Kamen et al. | |
| 2002/0023787 A1 | 2/2002 | Kamen et al. | |
| 2004/0069543 A1 | 4/2004 | Kamen et al. | |
| 2004/0201271 A1 | 10/2004 | Kakinuma et al. | |
| 2005/0121238 A1 | 6/2005 | Ishii | |
| 2005/0121866 A1 | 6/2005 | Kamen et al. | |
| 2005/0126833 A1 | 6/2005 | Takenaka et al. | |
| 2007/0084662 A1 | 4/2007 | Oikawa | |
| 2007/0158117 A1 | 7/2007 | Alexander | |
| 2007/0251735 A1 | 11/2007 | Kakinuma et al. | |
| 2007/0296170 A1 | 12/2007 | Field et al. | |
| 2008/0161990 A1 | 7/2008 | Gansler | |
| 2008/0245594 A1 | 10/2008 | Ishii et al. | |
| 2008/0271938 A1 | 11/2008 | Gulak | |
| 2009/0055033 A1 | 2/2009 | Gansler et al. | |
| 2009/0105908 A1 | 4/2009 | Casey et al. | |
| 2009/0288900 A1 | 11/2009 | Takenaka et al. | |
| 2010/0017069 A1 | 1/2010 | Miki et al. | |
| 2010/0030440 A1 | 2/2010 | Kosaka | |
| 2010/0030441 A1 | 2/2010 | Kosaka | |
| 2010/0030442 A1 | 2/2010 | Kosaka | |
| 2010/0038960 A1 | 2/2010 | Takenaka et al. | |
| 2010/0070132 A1 | 3/2010 | Doi | |
| 2010/0071984 A1 | 3/2010 | Doi et al. | |
| 2010/0096905 A1* | 4/2010 | Takenaka | B60B 19/00 301/5.23 |
| 2010/0114420 A1 | 5/2010 | Doi | |
| 2010/0114421 A1 | 5/2010 | Doi | |
| 2010/0114468 A1 | 5/2010 | Field et al. | |
| 2010/0152987 A1 | 6/2010 | Gorai | |
| 2010/0168993 A1 | 7/2010 | Doi et al. | |
| 2010/0235028 A1* | 9/2010 | Ishii | B62K 3/007 701/22 |
| 2010/0299044 A1 | 11/2010 | Miyake et al. | |
| 2011/0006498 A1 | 1/2011 | Mercier | |
| 2011/0010066 A1 | 1/2011 | Fuwa | |
| 2011/0035101 A1 | 2/2011 | Kawada et al. | |
| 2011/0060518 A1 | 3/2011 | Kosaka | |
| 2011/0067936 A1 | 3/2011 | Takenaka et al. | |
| 2011/0070998 A1 | 3/2011 | Takenaka et al. | |
| 2011/0071714 A1 | 3/2011 | Takenaka | |
| 2011/0071715 A1 | 3/2011 | Akimoto et al. | |
| 2011/0071752 A1 | 3/2011 | Takenaka et al. | |
| 2011/0098884 A1 | 4/2011 | Doi | |
| 2011/0118968 A1 | 5/2011 | Takenaka et al. | |
| 2011/0130925 A1 | 6/2011 | Oikawa | |
| 2011/0166713 A1 | 7/2011 | Tsuji et al. | |
| 2011/0209929 A1 | 9/2011 | Heinzmann et al. | |
| 2011/0209932 A1* | 9/2011 | Takenaka | B60B 19/003 180/15 |
| 2011/0213522 A1 | 9/2011 | Stevens et al. | |
| 2011/0233989 A1 | 9/2011 | Takenaka et al. | |
| 2011/0264350 A1 | 10/2011 | Doi | |
| 2012/0046856 A1 | 2/2012 | Doi | |
| 2012/0123647 A1 | 5/2012 | Doi et al. | |
| 2012/0173041 A1* | 7/2012 | Takenaka | B62J 1/005 701/1 |
| 2012/0173042 A1 | 7/2012 | Takenaka et al. | |
| 2012/0173086 A1 | 7/2012 | Takenaka et al. | |
| 2012/0217072 A1 | 8/2012 | Hoffmann et al. | |
| 2012/0232757 A1 | 9/2012 | Oikawa | |
| 2013/0133959 A1 | 5/2013 | Kamiyama et al. | |
| 2013/0299254 A1* | 11/2013 | Mutoh | B62K 3/007 180/21 |
| 2013/0299263 A1* | 11/2013 | Shimizu | B62K 1/00 180/220 |
| 2014/0188338 A1 | 7/2014 | Ito et al. | |
| 2014/0236426 A1 | 8/2014 | Kosaka et al. | |
| 2014/0330507 A1 | 11/2014 | Oikawa | |

FOREIGN PATENT DOCUMENTS

| | | |
|---|---|---|
| EP | 1 632 428 A1 | 3/2006 |
| EP | 2 045 180 A1 | 4/2009 |
| EP | 2 052 924 A1 | 4/2009 |
| EP | 2 163 467 A1 | 3/2010 |
| EP | 2 319 750 A1 | 5/2011 |
| GB | 2 242 173 A | 9/1991 |
| GB | 2242173 A | 9/1991 |
| JP | 4-130596 U | 11/1992 |
| JP | 2004/129435 A | 4/2004 |
| JP | 4181113 B2 | 11/2008 |
| JP | 2010-167807 A | 8/2010 |
| JP | 2010-167808 A | 8/2010 |
| JP | 2011-57111 A | 3/2011 |
| JP | 2011-63183 A | 3/2011 |
| JP | 2011-63241 A | 3/2011 |
| JP | 2011-063242 A | 3/2011 |
| JP | 2011-63243 A | 3/2011 |
| JP | 2011/083183 A | 3/2011 |
| JP | 2011-68222 A | 4/2011 |
| TW | M424290 U1 | 3/2012 |
| WO | WO 02/30730 A2 | 4/2002 |
| WO | WO 2008/132778 A1 | 11/2008 |
| WO | WO 2008/132779 A1 | 11/2008 |
| WO | WO 2010/113439 A1 | 10/2010 |
| WO | WO 2011/033575 A1 | 3/2011 |
| WO | WO 2012/017335 A1 | 2/2012 |

OTHER PUBLICATIONS

Extended European Search Report for Application 14169800.1 dated Oct. 7, 2014.
U.S. Appl. No. 14/225,489, filed Mar. 26, 2014.
U.S. Appl. No. 14/225,593, filed Mar. 26, 2014.
U.S. Appl. No. 14/225,471, filed Mar. 26, 2014.
U.S. Appl. No. 14/225,777, filed Mar. 26, 2014.
U.S. Appl. No. 14/225,564, filed Mar. 26, 2014.
U.S. Appl. No. 14/223,360, filed Mar. 24, 2014.
U.S. Appl. No. 14/246,846, filed Apr. 7, 2014.
U.S. Appl. No. 14/273,075, filed May 8, 2014.
U.S. Office Action for U.S. Appl. No. 14/223,360, dated Sep. 3, 2015.
U.S. Office Action for U.S. Appl. No. 14/225,471, dated Oct. 1, 2015.
U.S. Office Action for U.S. Appl. No. 14/225,777, dated Oct. 5, 2015.
U.S. Office Action, dated Oct. 7, 2015, for U.S. Appl. No. 14/225,489.
U.S. Office Action, dated Oct. 9, 2015, for U.S. Appl. No. 14/246,846.
Al-Hadithi et al., "Fuzzy Optimal Control for Double Inverted Pendulum", 7th IEEE Conference on Industrial Electronics and Applications (ICIEA), 2012, pp. 1-5.
Chen, "Analysis and Design of Robust Feedback Control Systems for a Nonlinear Two-Wheel Inverted Pendulum System", 2012 International Symposium on Computer, Consumer and Control, IEEE, 2012, 1 page (abstract only).
Ghorbani et al., "Fault tolerant improvement with chaos synchronization using Fuzzy-PID control", 13th Iranian Conference on Fuzzy Systems (IFSC), IEEE, 2013, 5 pages.
Jiang et al., "High Gain Disturbance Observer and Its Application in Robust Control Attenuation", Proceeding of the IEEE International Conference on Information and Automation, IEEE, Aug. 2013, pp. 230-235.

(56) References Cited

OTHER PUBLICATIONS

Lee et al., "Application of Dynamic Inversion with Extended High-Gain Observers to Inverted Pendulum on a Cart", 2013 American Control Conference (ACC), Jun. 17-19, 2013, AACC, 4234-4238.
Phaoharuhansa et al., "Trajectory Tracking for Wheeled Inverted Pendulum Robot using Tilt Angle Control", IEEE, 2013, pp. 4288-4293.
Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.
Zhang et al., "Variable Gain Linear Quadratic Regulator and Its Application", Proceedings of 2014 IEEE International Conference on Mechatronics and Automation, Aug. 3-6, 2014, pp. 1745-1750.
Notice of Allowance dated Feb. 25, 2015 issued in co-pending U.S. Appl. No. 14/273,075.
Office Action dated Feb. 24, 2015 issued in co-pending U.S. Appl. No. 14/223,360.
Notice of Allowance in related case U.S. Appl. No. 14/225,471 dated Apr. 4, 2016.
Notice of Allowance issued in related U.S. Appl. No. 14/225,777 on Feb. 2, 2016.
Japan Office Action for JP 2013-115730 dated Sep. 20, 2016 and English translation of pertinent portions.

* cited by examiner

INVERTED PENDULUM TYPE VEHICLE

CROSS-REFERENCE TO RELATED APPLICATIONS

The present application claims priority under 35 USC 119 to Japanese Patent Application No. 2013-115730 filed May 31, 2013 the entire contents of which are hereby incorporated by reference.

BACKGROUND OF THE INVENTION

1. Field of the Invention

The present invention relates to an inverted pendulum type vehicle. More specifically, to the placement of electric drive units and a battery mounted on a vehicle body frame.

2. Description of Background Art

An inverted pendulum type vehicle is known wherein a vehicle body frame is provided with a main wheel made by combining a plurality of freely-rotatable driven rollers in such a manner that the rotational axis lines of these driven rollers form an annular shape. A pair of left and right drive disks are provided that are rotatably supported by the vehicle body frame in such a manner so as to be substantially concentric with the rotational axis line of the main wheel and to be located on both sides of the main wheel with the plurality of freely-rotatable drive rollers being disposed in contact with the driven rollers with a torsional relationship. A drive means is provided that individually drives the left and right drive disks. See, for example, Japanese Patent Laid-Open No. 2011-68222.

In the inverted pendulum type vehicle according to Japanese Patent Laid-Open No. 2011-68222, the drive means including the electric motors is disposed above the main wheel and the drive disks and the rotational force of the electric motors is transmitted to the drive disks by transmission belts.

In the case of the inverted pendulum type vehicle in which a rider saddle is provided at an upper part of the vehicle body frame or rider steps are provided on the left and right sides of a lower part of the vehicle body frame or both of the saddle and the steps are provided and on which a rider rides in such a manner so as to straddle the main wheel in the left-right direction, it is demanded to suppress the height of the vehicle body frame in consideration of the ease of getting-on and getting-off of the rider. In particular, in the inverted pendulum type vehicle in which the rider saddle is provided at the upper part of the vehicle body frame, it is demanded that the height of the rider saddle from the floor surface is low so that the rider may easily sit on the rider saddle. Furthermore, with this demand met, it is demanded that the drive means and so forth mounted on the vehicle body frame does not get in the way of the rider when the rider gets on or off the vehicle and when the rider is in the riding state.

SUMMARY AND OBJECTS OF THE INVENTION

An object of an embodiment of the present invention is to suppress the height of a vehicle body frame of an inverted pendulum type vehicle in consideration of the ease of getting-on and getting-off of a rider and the set placement of the drive means and so forth mounted on the vehicle body frame in such a manner so that the drive means and so forth do not get in the way of the rider when the rider gets on or off the vehicle and when the rider is in the riding state.

An inverted pendulum type vehicle according to an embodiment of the present invention includes a vehicle body frame (2), a main wheel (3) made by combining a plurality of freely-rotatable driven rollers (54) in such a manner that the rotational axis lines of the driven rollers (54) form an annular shape, and a pair of left and right drive disks (50) that are rotatably supported by the vehicle body frame (2) in such a manner so as to be located on both the left and right sides of the main wheel (3) and to which a plurality of drive rollers (58) disposed in contact with the driven rollers (54) are freely rotatably attached. The inverted pendulum type vehicle (1) further has a pair of left and right drive units (7) that are attached to the vehicle body frame (2) and rotationally drive the pair of drive disks (50) individually under inverted pendulum control and a battery (9) that is attached to the vehicle body frame (2) and supplies electric power to the pair of drive units (7). A rider rides on the inverted pendulum type vehicle (1) in such a manner so as to straddle the main wheel (3) in a left-right direction. In this vehicle (1), the pair of drive units (7) are disposed so as to be juxtaposed in the left-right direction at the same-height positions higher than the main wheel (3), and the pair of drive units (7) and the battery (9) are so disposed as to be juxtaposed in front and behind of the vehicle body frame (2).

According to an embodiment of the present invention, the height of the inverted pendulum type vehicle (1) can be suppressed and it becomes easy for a rider to get on and off the vehicle (1) in such a manner so as to straddle the main wheel (3) in the left-right direction compared with a case in which the left and right drive units (7) are disposed at vertically different levels and a case in which the drive units (7) and the battery (9) are disposed so as to be vertically juxtaposed.

According to an embodiment of the present invention, preferably, the pair of drive units (7) each have an electric motor (61), a reduction device (62) that reduces the rotational speed of the electric motor (61), and a reducer case (182) that houses the reduction device (62). Furthermore, output shafts (194, 205) of the reduction devices (62) that output power to the drive disks (50) protrude from wall parts of the reducer case (182) on the outside in the vehicle width direction to the outside in the vehicle width direction, and the electric motors (61) are attached to the wall parts of the reducer case (182) on the outside in the vehicle width direction and protrude from the wall parts to the outside in the vehicle width direction.

According to an embodiment of the present invention, the left and right electric motors (61) are each attached to the same side as the protrusion side of the output shaft (194, 205) corresponding on the left or right side and each protrude to the same side as the protrusion side of the output shaft (194, 205). Therefore, the left and right drive units (7) can be disposed close to each other in the vehicle width direction. This can reduce the vehicle width of the inverted pendulum type vehicle (1) and makes it easy for a rider to get on and off the vehicle (1) in such a manner so as to straddle the main wheel (3) in the left-right direction.

According to an embodiment of the present invention, preferably, constituent parts (183, 184, 185) of the reducer case (182) of the pair of drive units (7) are directly connected to each other.

According to an embodiment of the present invention, the size of the whole of the reducer case (182) of the pair of drive units (7) in the vehicle width direction can be suppressed to a small size and the number of parts of the reducer case (182) can be reduced compared with a structure in which the constituent parts (183, 184, 185) of the reducer case (182) are separate ones in the pair of drive units (7).

According to an embodiment of the present invention, preferably, the wall part (185) of the reducer case (182) on the inside in the vehicle width direction is shared by the pair of drive units (7).

According to an embodiment of the present invention, the size of the whole of the reducer case (182) of the left and right drive units (7) in the vehicle width direction can be suppressed to a further smaller size. Furthermore, the reducer case (182) has a structure in which a partition wall exists at the intermediate part, which enhances the rigidity of the reducer case (182).

According to an embodiment of the present invention, preferably, the output shafts (194, 205) of the pair of drive units (7) are disposed on the same axis line in such a manner that a center axis line of the output shafts (194, 205) is parallel to a center axis line of the drive disks (50), and a power transmission mechanism by transmission belts (66) that transmit rotation of the output shafts (194, 205) to the drive disks (50) is provided. Furthermore, the drive units (7) are attached to the vehicle body frame (2) in such a manner so that the attached position of the drive units (7) relative to the vehicle body frame (2) is changeable in such a direction so as to increase or decrease the distance between the center axis line of the output shafts (194, 205) and the center axis line of the drive disks (50).

According to an embodiment of the present invention, the tension of the left and right transmission belts (66) can be adjusted under the same condition by adjustment of the attached position of the drive units (7) relative to the vehicle body frame (2).

According to an embodiment of the present invention, preferably, the drive units (7) are attached to the vehicle body frame (2) pivotally around an axis line parallel to the center axis line of the output shafts (194, 205) at a position separate from the center axis line of the output shafts (194, 205) across the electric motors (61).

According to an embodiment of the present invention, a large distance can be ensured as the distance from the pivot center of the drive units (7) to the output shafts (194, 205) and the adjustable range of the tension of the transmission belts (66) is widened with a small pivot angle.

According to an embodiment of the present invention, preferably, a rider saddle (84) is attached to an upper part of the vehicle body frame (2) and the electric motors (61) are disposed at positions directly beneath the rider saddle (84).

According to an embodiment of the present invention, lower extremities M under the knees of a rider sitting on the rider saddle (84) are located forward of the rider saddle (84). In contrast, the electric motors (61) are disposed at positions directly beneath the rider saddle (84). Therefore, although the electric motors (61) are transversely mounted and protrude outward in the vehicle width direction, the lower extremities M of the rider sitting on the rider saddle (84) do not come in contact with the electric motor (61). This provides a comfortable sitting environment.

According to an embodiment of the present invention, preferably, the whole of the electric motors (61) is disposed inside an outer contour line of the rider saddle (84) in plan view.

According to an embodiment of the present invention, although the electric motors (61) are transversely mounted and protrude outward in the vehicle width direction, the lower extremities M of the rider sitting on the rider saddle (84) do not get contact with the electric motor (61), so that a comfortable sitting environment is achieved.

According to an embodiment of the present invention, preferably, a rider step (101) is attached below the vehicle body frame (2), and the electric motors (61) are disposed closer to the inside in the vehicle width direction than virtual lines (L1) linking outermost points of the rider saddle (84) in the vehicle width direction and outermost points of the footstep (101) in the vehicle width direction, corresponding to each other on the left and right sides.

According to an embodiment of the present invention, even when the inverted pendulum type vehicle (1) laterally falls, the electric motor (61) does not abut against the floor surface.

According to an embodiment of the present invention, preferably, the reduction devices (62) have drive gears (186, 198) fixed to rotor shafts (64) of the electric motors (61), driven gears (195, 206) fixed to the output shafts (194, 205), idle gears (196, 197, 207, 208) that mesh with the drive gears (186, 198) and the driven gears (195, 206), and idle gear shafts (193, 204) that support the idle gears (196, 197, 207, 208). Furthermore, the rotor shafts (64), the output shafts (194, 205), and the idle gear shafts (193, 204) are parallel to each other and the rotor shafts (64), the output shafts (194, 205), and the idle gear shafts (193, 204) are so disposed that a virtual line (L0) linking center axis lines of these shafts is a bent line convex upward.

According to an embodiment of the present invention, the inter-shaft distance between the rotor shafts (64) and the output shafts (194, 205) is shortened. Thus, the anteroposterior length of the reduction devices (62) can be set short compared with the case in which the left and right rotor shafts (64), the output shafts (194, 205), and the idle gear shafts (193, 204) are disposed along the front-rear direction in one straight line manner, and the vertical length of the reduction devices (62) can be set short compared with the case in which the left and right rotor shafts (64), the output shafts (194, 205), and the idle gear shafts (193, 204) are disposed along the vertical direction in one straight line manner. This can achieve both the advantage that the lower extremities M of the rider sitting on the rider saddle (84) do not get contact with the reduction device (62) and the advantage that the height of the vehicle body frame (2) is suppressed.

According to an embodiment of the present invention, preferably, the battery (9) is disposed at a position above the main wheel (3) and a power drive unit (44) that controls electric power supplied from the battery (9) to the drive units (7) is disposed adjacent to the upper side or the lower side of the battery (9). Furthermore, a posture sensing device (91) that senses the posture of the vehicle body frame (2) for the inverted pendulum control is disposed in a space made between the main wheel (3) and the battery (9) or the power drive unit (44).

According to an embodiment of the present invention, efficient use of the dead space is achieved and the inverted pendulum type vehicle (1) can be made as a compact vehicle.

According to the inverted pendulum type vehicle in accordance an embodiment of the present invention, the left and right drive units are disposed so as to be juxtaposed in the left-right direction at same-height positions higher than the main wheel, and the left and right drive units and the battery are disposed so as to be juxtaposed in front and behind of the vehicle body frame. Therefore, the height of the inverted pendulum type vehicle can be suppressed and it becomes easy for a rider to get on and off the vehicle in such a manner so as to straddle the main wheel in the left-right direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not imitative of the present invention, and wherein.

DETAILED DESCRIPTION OF THE PREFERRED EMBODIMENTS

Figure 1:
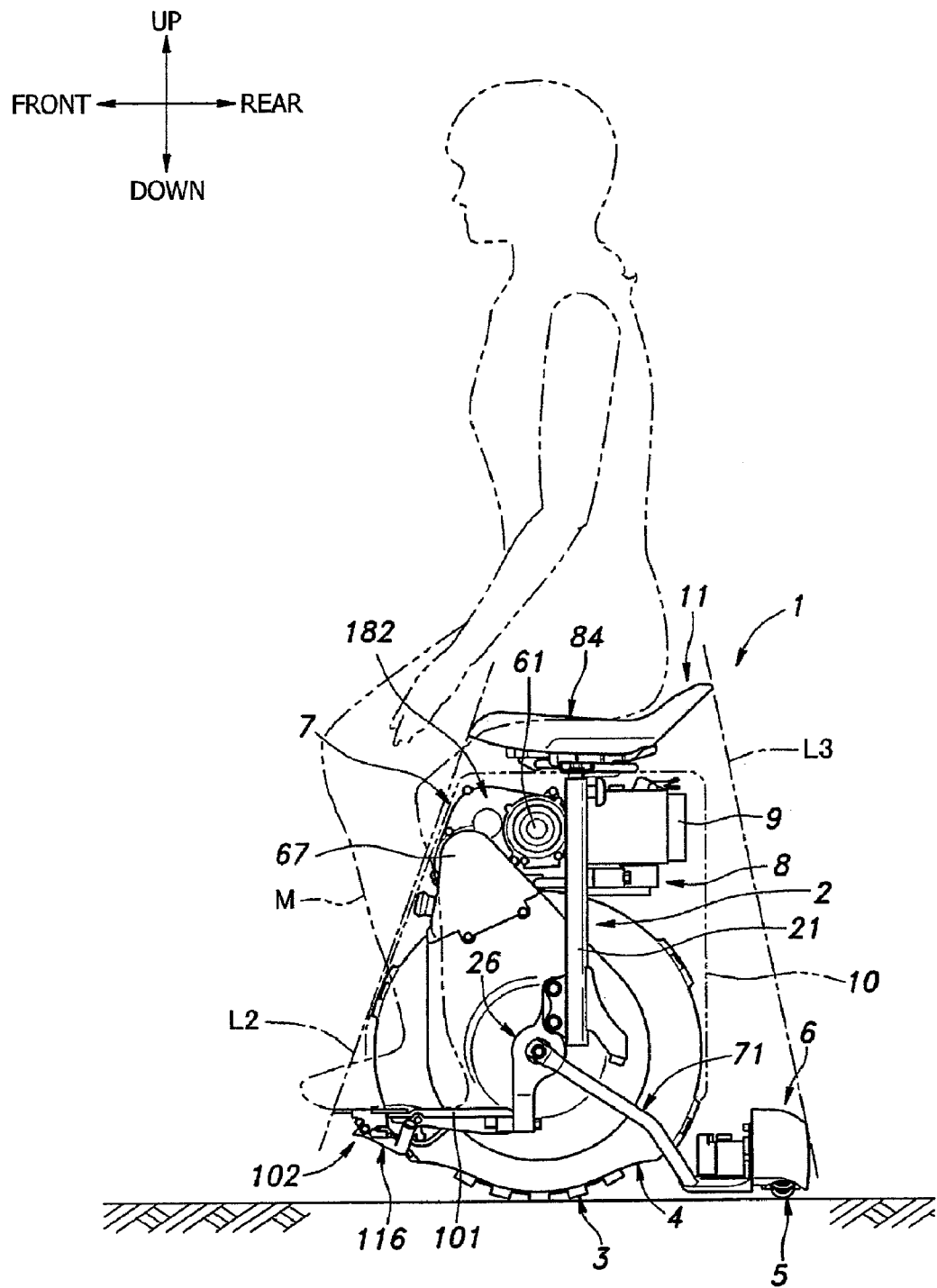
FIG. 1 is a side view showing one embodiment of the inverted pendulum type vehicle according to the present invention.

An embodiment of the inverted pendulum type vehicle of the present invention will be described below with reference to the drawings. In the following description, the respective directions are defined on the basis of the rider sitting on the inverted pendulum type vehicle.

As shown in FIGS. 1 to 4, an inverted pendulum type vehicle 1 has the following components a vehicle body frame 2; a main wheel unit 4 including a main wheel 3; a tail wheel unit 6 including a tail wheel 5; drive units 7 for driving the main wheel unit 4; an electric equipment unit 8 for controlling the drive units 7 and the tail wheel (sub-wheel) unit 6; a battery pack 9 for supplying power to the electric equipment unit 8; a saddle unit 11 including a saddle (rider saddle) 84 on which a rider sits; a step unit 35 including a footstep (rider step) 101 as a footrest part for the rider; and an outer shell 10 for covering the outside of substantially the upper half of the main wheel unit 4, the drive units 7, the electric equipment unit 8, and the battery pack 9.

Figure 5:
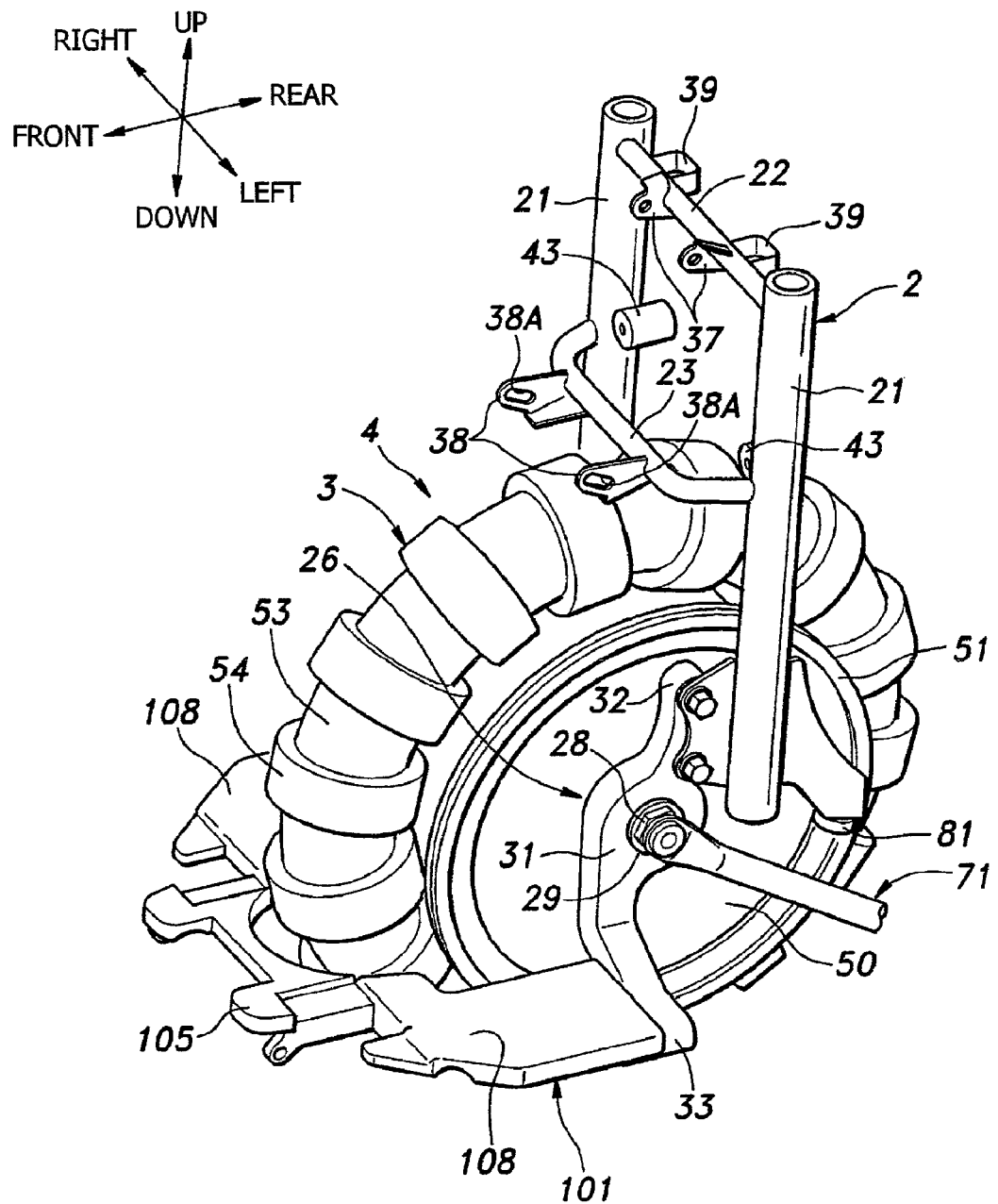
FIG. 5 is a perspective view of a vehicle body frame and a main wheel unit used for the inverted pendulum type vehicle according to the present embodiment.

As shown in FIG. 5, the vehicle body frame 2 has a pair of left and right side posts 21 extending vertically and an upper beam 22 and a middle beam 23 that extend along the left-right direction (vehicle width direction) and connect the left and right side posts 21 to each other. The upper beam 22 horizontally extends in a straight line manner with both the left and right ends thereof being joined to upper end parts of the left and right side posts 21. The middle beam 23 has a staple shape protruding forward in plan view. It is disposed downward of the upper beam 22 and both the left and right ends thereof are joined to vertically intermediate parts of the left and right side posts 21.

The side posts 21, the upper beam 22, and the middle beam 23 are formed from steel or aluminum pipe materials and are joined to each other by bolt fastening or welding. Hereinafter, the term "join" includes publicly-known joining techniques such as bolt fastening and welding unless a limitation is specifically stated. In other embodiments, the side posts 21, the upper beam 22, and the middle beam 23 may be formed from a publicly-known material such as pressed steel plate.

Left and right mount members (axle support members) 26 that support an axle 25 of the main wheel unit 4, to be described later, are joined to lower end parts of the left and right side posts 21, respectively. The left and right mount members 26 each have the following components an axle support part 31 having a boss shape in which an axle hole (not shown) is through-formed; a post-joined part 32 that extends upwardly from the axle support part 31 and is joined to the lower end part of the side post 21; and a step-joined part 33 extending downwardly from the axle support part 31. After extending downwardly from the axle support part 31, the left and right step joined parts 33 bend into such a direction so as to separate from each other in the left-right direction (to the outside in the vehicle width direction). The step unit 35 is attached to the lower ends of the left and right step joined parts 33. The axle holes (not shown) of the left and right mount members 26 are formed on the same axis line extending along the left-right direction.

To the upper beam 22, a pair of left and right first brackets 37 are joined so as to protrude forward. To the middle beam 23, a pair of left and right second brackets 38 are joined so as to protrude forward. The first brackets 37 and the second brackets 38 are parts for attaching the drive units 7. The attaching structure of the drive units 7 will be described in detail later. To the upper beam 22, a pair of left and right third brackets 39 are joined so as to protrude rearwardly. To the third brackets 39, a battery case 41 (see FIGS. 1 to 3) is attached that attachably/detachably supports the battery pack 9. The attaching structure of the battery case 41 will also be described in detail later. Electric equipment unit attaching parts 43 as bolt bosses are provided at vertically intermediate parts of the left and right side posts 21.

As shown in FIGS. 1 to 4, the saddle unit 11 includes the rider saddle 84 that supports the hip of the rider. The rider saddle 84 has a plate-shaped base member 86 serving as the framework (bottom plate) and a flexible pad 87 attached to an upper part of the base member 86. At lower parts of the base member 86, a pair of left and right seat posts 85 protrude downwardly.

The left and right seat posts 85 are inserted into the left and right side posts 21 from upper end openings of the side posts 21 in a storage tube manner and are supported by the side posts 21. Near the upper ends of the left and right side posts 21, adjustment screws 88 that penetrate the side posts 21 in the radial direction are screwed. In the left and right seat posts 85, a plurality of receptor holes (not shown) that penetrate in the diameter direction and receive the adjustment screws 88 are formed along the longitudinal direction (height direction) of the seat posts 85. The depth of the insertion of the seat post 85 into the side post 21 is selected by selection of the receptor hole through which the adjustment screw 88 passes. This can adjust the height of the rider saddle 84 relative to the side post 21.

The rider saddle 84 has a comparatively large plane area and protrudes from the seat posts 85 to a large extent in the forward direction, the rearward direction and the left and right directions. Due to this, the outer contour line of the rider saddle 84 exists at positions greatly distant from the left and right seat posts 85 in the forward direction, the rearward direction and the left and right directions.

As shown in FIGS. 1 to 4, the step unit 35 includes the footstep 101 for supporting the soles of the rider and a stand device 102 provided on the footstep 101.

The footstep 101 has left and right footrest parts 108 on which the soles of the rider can be placed and a front connector 105 that connects the front ends of the left and right footrest parts 108 to each other with a U-shape opened rearward in plan view. The rear ends of the left and right footrest parts 108 are fixed to the step joined parts 33 by bolt fastening. Because of this attaching, the front connector 105 extends so as to traverse in front of the main wheel 3 along the vehicle width direction. The left and right footrest parts 108 are positioned on both the left and right sides of the main wheel unit 4. They each protrude outward in the vehicle width direction on the corresponding side and are substantially horizontal in the state in which the inverted pendulum control is carried out.

The stand device 102 is to keep the inverted pendulum type vehicle 1 at the standing state when the vehicle 1 is not used and the inverted pendulum control is not carried out. The stand device 102 has a pair of left and right stand arms (stands) 116, a pedal 117 for standing, and a pair of left and right pedals 118 for housing.

The pair of left and right stand arms 116 are symmetric with each other in the left-right direction and each have a columnar stand base part 125 extending in a straight line manner and a grounded part 126 provided at the tip of the stand base part 125. In the present embodiment, the stand arm 116 has a substantially L-shape because the grounded part 126 extends in a direction perpendicular to the stand base part 125. The base ends of the stand base parts 125 are attached to a bottom part of the front connector 105 of the footstep 101 by a shaft 127 in such a manner so that the left and right stand atlas 116 can pivot.

Figure 2:
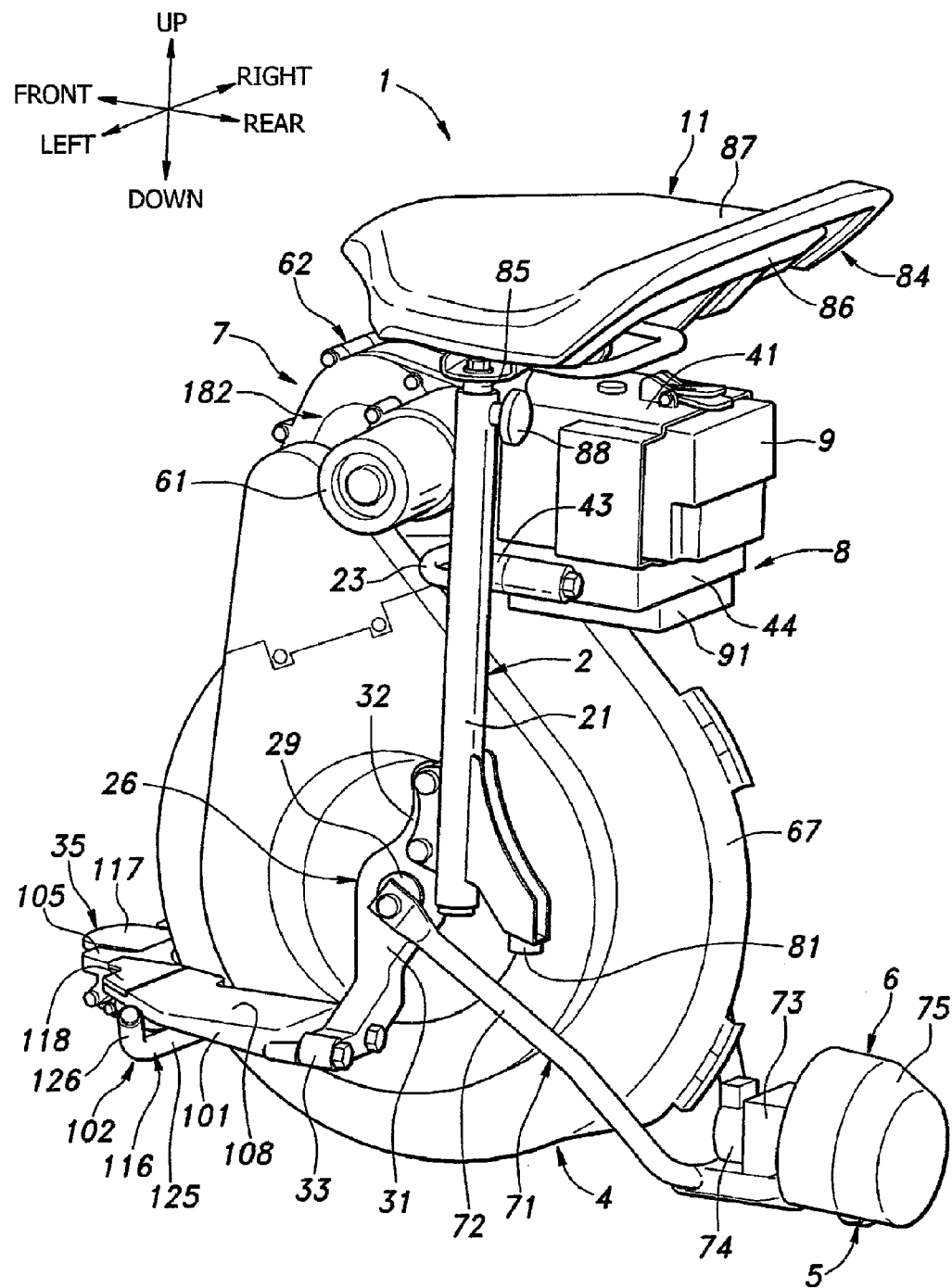
FIG. 2 is a perspective view of the inverted pendulum type vehicle according to the present embodiment.
Figure 3:
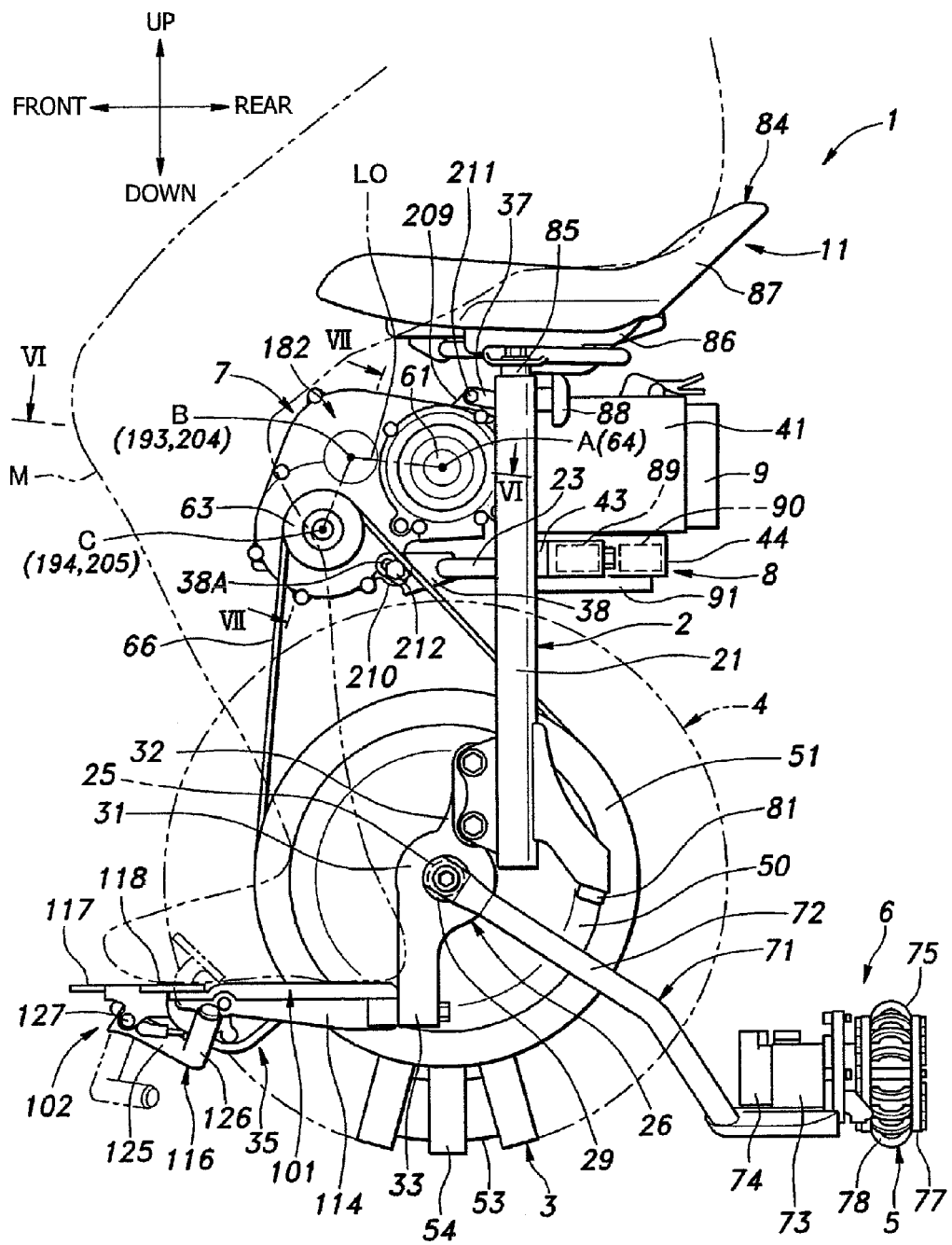
FIG. 3 is a side view of the inverted pendulum type vehicle according to the present embodiment in a state in which covers are removed.

With the shaft 127 serving as the pivot center, the stand arms 116 can pivot between a housing position to which the grounded part 126 is flipped up upward from the ground surface (floor surface) (position indicated by solid lines in FIGS. 1 to 3) and a standing position at which the grounded part 126 is grounded to the ground surface as the result of being moved downward (position indicated by a virtual line in FIG. 3). At the standing position (stand-used position), the stand arms 116 keep the inverted pendulum type vehicle 1 at the standing state in which the vehicle 1 is leaned forward to form an angle of about 80 degrees with the ground surface.

The pedal 117 for standing is attached to the front connector 105 of the footstep 101 and is link-connected to the stand arms 116. By being pressed down, the pedal 117 makes the stand arms 116 pivot from the housing position to the standing position.

The pedals 118 for housing are each provided for a respective one of the left and right footrest parts 108 of the footstep 101 and are link-connected to the stand arms 116. In the state in which the stand arm 116 exists at the standing position, the tread surface of the pedal 118 rises upwardly from the top surface of the footrest part 108 as shown by a virtual line in FIG. 3.

By being pressed down in the state of being raised upwardly, the pedal 118 for housing makes the stand arm 116 pivot from the standing position to the housing position. In the state in which the stand arm 116 exists at the housing position, as shown by solid lines in FIGS. 1 to 3, the tread surface of the pedal 118 for housing is flush with the top surface of the footrest part 108 and is in the state of being unable to be further pressed down.

As shown in FIGS. 1 to 4, the main wheel unit 4 is disposed between the left and right mount members 26 and between the left and right side posts 21. The main wheel unit 4 has the following components the axle 25; left and right drive disks 50 supported on the outer circumference of the axle 25 rotatably independently of each other; the substantially annular main wheel 3 that is disposed between the left and right drive disks 50 and through which the axle 25 passes through the space inside its annular shape; and left and right driven pulleys (large-diameter pulleys) 51 for cog belts joined to the pair of left and right drive disks 50.

Left and right end parts of the axle 25 penetrate through the axle holes (not shown) through-formed in the left and right mount members 26 with washers 29 disposed outside the left and right mount members 26 in the vehicle width direction, and are fixed to the left and right mount members 26 by axle fastening bolts 28 screwed to these left and right end parts of the axle 25. Due to this, the axle 25 extends along the vehicle width direction (left-right direction) in such a manner as to bridge the left and right mount members 26 and both ends thereof are non-rotatably fixed to the left and right mount members 26.

The left and right drive disks 50 and the left and right driven pulleys 51 all have the center axis line of the axle 25 as a common axis line and exist on the same axis line. On the outer circumference of the axle 25, a pair of left and right step parts (not shown) are formed at a predetermined interval in the axis line direction. The left and right drive disks 50 are each held between a nut (not shown) screwed to the axle 25 and the step part of the axle 25, so that the positions thereof in the axis line direction of the axle 25 (distance between the left and right drive disks 50 in the axis line direction) are settled.

The main wheel 3 is a drive wheel driven based on the inverted pendulum control. It is composed of an annular member 53 made of a metal with a plurality of driven rollers (free rollers) 54 attached to the outer circumference of the annular member 53, and is grounded at outer circumferential surfaces of the driven rollers 54. The driven roller 54 is composed of a base part 54A that is rotatably mounted on the outer circumference of the annular member 53 and is made of a cylindrical metal and an outer circumferential part 54B that is bonded to the outer circumference of the base part 54A by cure adhesion and is made of cylindrical rubber. A plurality of the driven rollers 54 are provided in the annular direction (circumferential direction) of the annular member 53 with each capable of individually rotating (spinning) with the rotation center being the tangent to the annular member 53 at the placement position of the driven roller 54. That is, the main wheel 3 is made by combining the plurality of driven rollers 54 capable of independently spinning in such a manner that they form a circular ring. Strictly speaking, the plurality of driven rollers 54 form the main wheel 3 by being combined so as to form a polygonal shape having the number of corners according to the number of driven rollers 54.

The left and right drive disks 50 form a circular disk shape having an outer diameter smaller than the center radius of the annular member 53 and an outer circumferential part thereof forms a substantially conical trapezoidal shape. On the outer circumferential part of the drive disk 50, a plurality of drive rollers 58 made of metal are rotatably supported at equal intervals in the circumferential direction. The drive rollers 58 of the drive disk 50 on the left side and the drive rollers 58 of the drive disk 50 on the right side are disposed so as to form a symmetrical shape in the left-right direction. The rotational center of each drive roller 58 is disposed so as to have a torsional relationship with the rotational center of the drive disk 50. Due to this, the left and right drive rollers 58 form a symmetrical shape in the left-right direction and have an inclined placement similar to that of the tooth trace of a helical gear.

An outer circumferential part of the drive roller 58 of the drive disk 50 is in contact with an outer circumferential part of the driven roller 54 of the main wheel 3 in a state of being pressed against it. The drive rollers 58 of the left and right drive disks 50 sandwich the driven roller 54 from both the left and right sides. This allows the main wheel 3 to be supported in a no-shaft state between the left and right drive disks 50 concentrically with the left and right drive disks 50 and rotate (revolve) around its own center together with the left and right drive disks 50.

In the above-described manner, the assembly as the main wheel unit 4 is made with the left and right drive disks 50, the left and right driven pulleys 51, the axle 25, and the main wheel 3.

Figure 4:
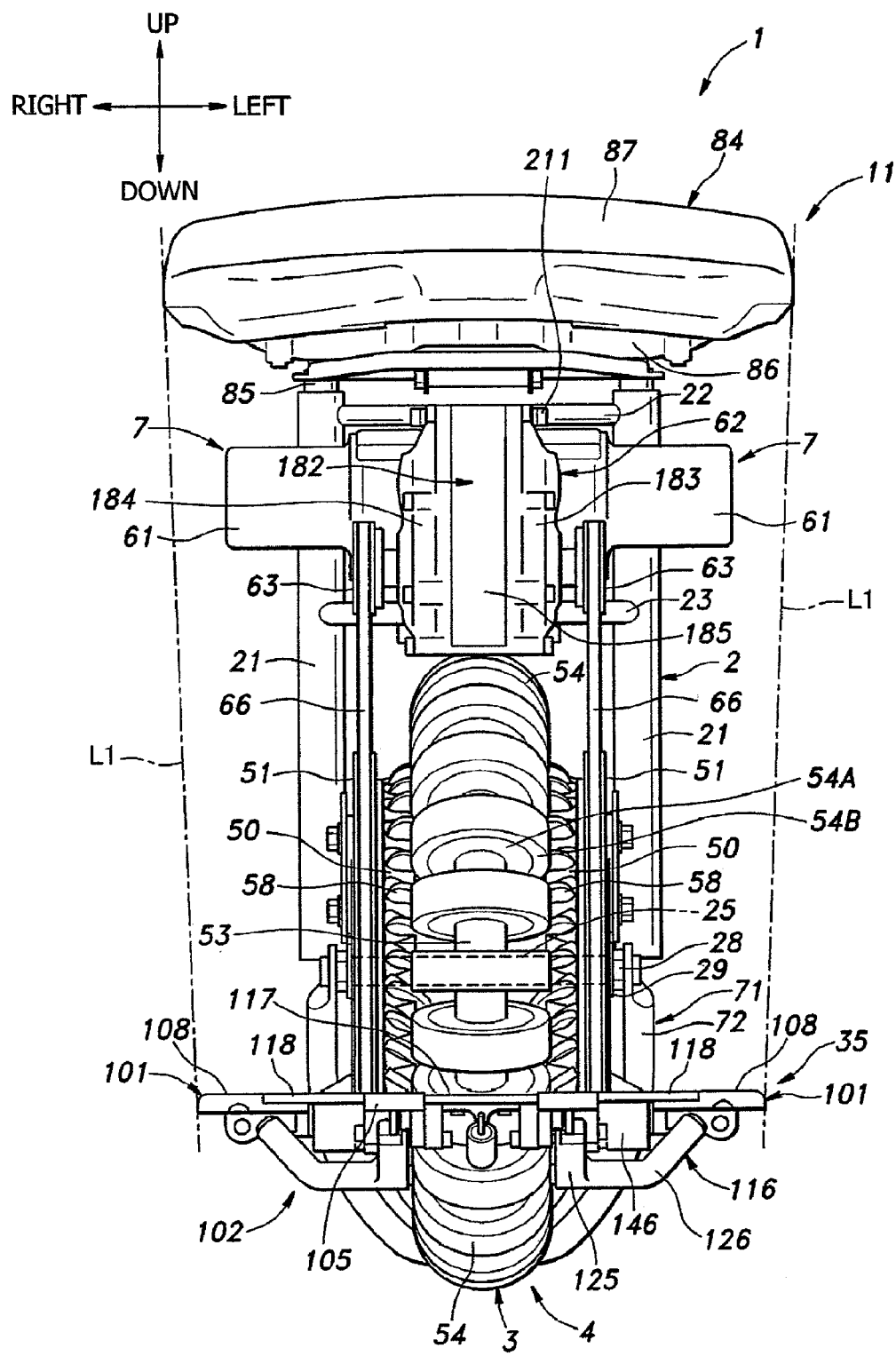
FIG. 4 is a front view of the inverted pendulum type vehicle according to the present embodiment.
Figure 6:
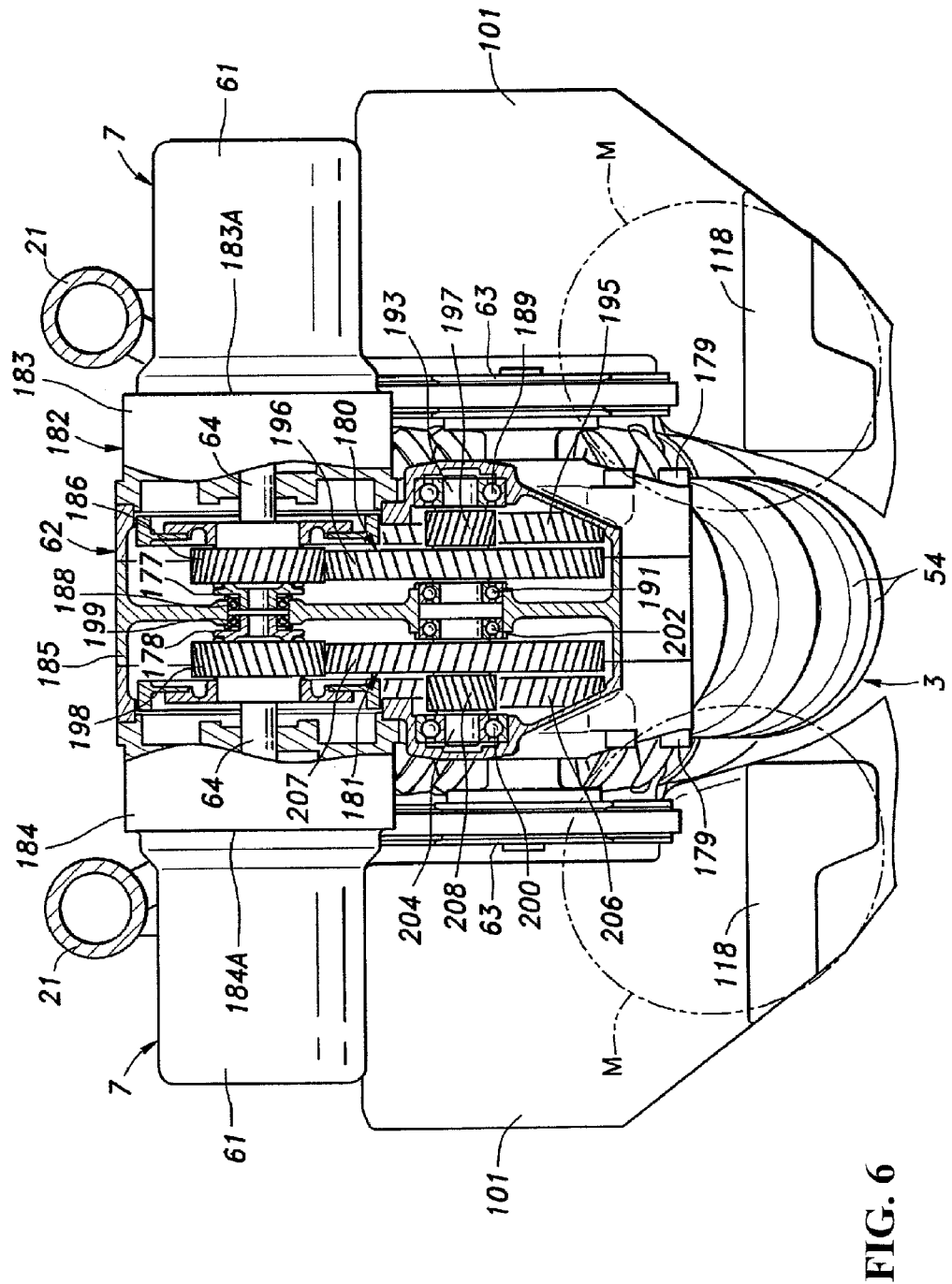
FIG. 6 is an enlarged sectional view along line VI-VI in FIG. 3.
Figure 7:
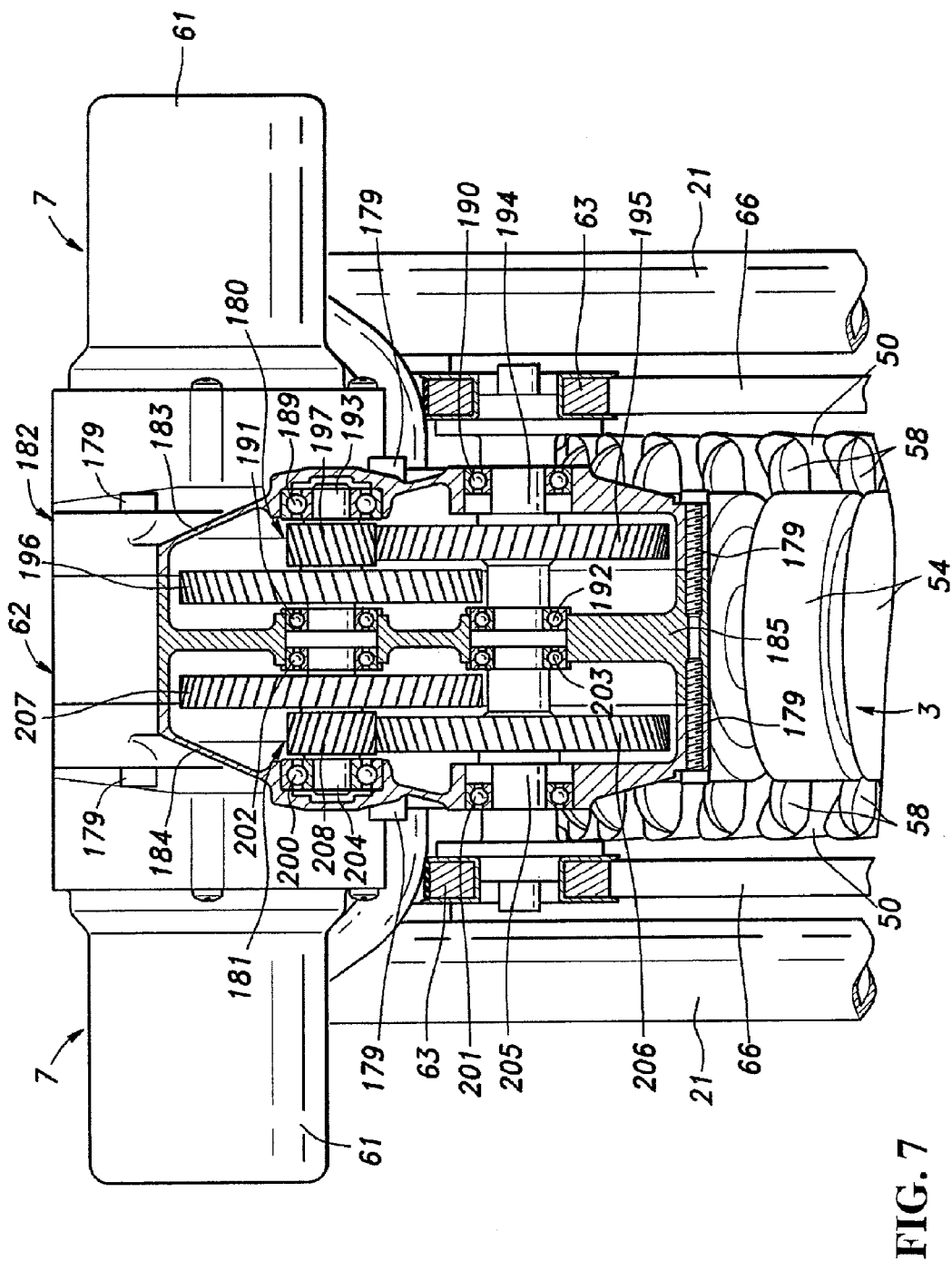
FIG. 7 is an enlarged sectional view along line VII-VII in FIG. 3.

As shown in FIGS. 3 and 4, the left and right drive units 7 each have an electric motor 61, a reduction device 62, and a drive pulley 63 for the cog belt. As shown in FIGS. 6 and 7, the reduction devices 62 individually have a left gear train 180 for the left electric motor 61 and a right gear train 181 for the right electric motor 61 and the whole thereof is housed in one gear case assembly (reducer case) 182.

The gear case assembly 182 is made by fastening a left case half-body 183, a right case half-body 184, and an intermediate case 185 that is disposed so as to be sandwiched by the left case half-body 183 and the right case half-body 184 to each other by bolts 179. The reducer case of the left drive unit 7 is formed by the left case half-body 183 and the intermediate case 185 and the reducer case of the right drive unit 7 is formed by the right case half-body 184 and the intermediate case 185. The left gear train 180 is housed in the reducer case formed by the left case half-body 183 and the intermediate case 185 and the right gear train 181 is housed in the reducer case formed by the right case half-body 184 and the intermediate case 185.

Because the reducer case of the left drive unit 7 is formed by the left case half-body 183 and the intermediate case 185 and the reducer case of the right drive unit 7 is formed by the right case half-body 184 and the intermediate case 185 as above, a structure is obtained in which the gear cases of the left and right drive units 7 are directly connected to each other and the intermediate case 185 allows the left and right drive units 7 to share one wall part as the wall part of the gear case on the inside in the vehicle width direction.

To a left wall 183A as the wall part of the left case half-body 183 on the outside in the vehicle width direction, the left electric motor 61 is fixed in a transversely-mounted state, i.e. with such placement that a rotor shaft (motor shaft) 64 extends along the left-right direction. To a right wall 184A as the wall part of the right case half-body 184 on the outside in the vehicle width direction, the right electric motor 61 is fixed in a transversely-mounted state, i.e. with such placement that the rotor shaft (motor shaft) 64 extends along the left-right direction. The center axis line of the rotor shafts 64 is parallel to the center axis line of the drive disks 50 and the rotor shafts 64 of the left and right electric motors 61 are disposed so as to exist on the same axis line. Due to this, the left and right electric motors 61 are disposed so as to be juxtaposed in the left-right direction at same-height positions higher than the main wheel 3.

The rotor shaft 64 of the left electric motor 61 has a part that penetrates the left wall 183A of the left case half-body 183 and is located in the left case half-body 183 and a drive gear (small-diameter gear) 186 is fixed to this part. A shaft body 177 is fixed on the same axis line as that of the rotor shaft 64 on the opposite side to the electric motor 61 when viewed along the axis line direction of the drive gear 186. The shaft body 177 is rotatably supported on the intermediate case 185 by a ball bearing 188.

The left case half-body 183 and the intermediate case 185 rotatably support each of an idle gear shaft 193 and an output shaft 194 of the left gear train 180 by the respective ball bearings 189, 190, 191, and 192. The idle gear shaft 193 and the output shaft 194 each extend along the left-right direction and the center axis line of the idle gear shaft 193 and the center axis line of the output shaft 194 are parallel to the center axis line of the drive disks 50.

A driven gear (large-diameter gear) 195 is fixed to the output shaft 194. A large-diameter idle gear 196 meshing with the drive gear 186 and a small-diameter idle gear 197 meshing with the driven gear 195 are fixed to the idle gear shaft 193.

The output shaft 194 has a part that penetrates the left wall 183A of the left case half-body 183 and protrudes to the outside of the left case half-body 183 (left side) and the drive pulley (small-diameter pulley) 63 for the left cog belt is fixed to this part. A left endless cog belt 66 is spanned between this left drive pulley 63 and the left driven pulley 51.

The rotor shaft 64 of the right electric motor 61 has a part that penetrates the right wall 184A of the right case half-body 184 and is located in the right case half-body 184 and a drive gear (small-diameter gear) 198 is fixed to this part. A shaft body 178 is fixed on the same axis line as that of the rotor shaft 64 on the opposite side to the electric motor 61 when viewed along the axis line direction of the drive gear 198. The shaft body 178 is rotatably supported on the intermediate case 185 by a ball bearing 199.

The right case half-body 184 and the intermediate case 185 rotatably support an idle gear shaft 204 and an output shaft 205 of the right gear train 181 by the respective ball bearings 200, 201, 202, and 203. The idle gear shaft 204 and the output shaft 205 each extend along the left-right direction and the center axis line of the idle gear shaft 204 with the center axis line of the output shaft 205 being parallel to the center axis line of the drive disks 50.

A driven gear (large-diameter gear) 206 is fixed to the output shaft 205. A large-diameter idle gear 207 meshing with the drive gear 198 and a small-diameter idle gear 208 meshing with the driven gear 206 are fixed to the idle gear shaft 204.

The output shaft 205 has a part that penetrates the right wall 184A of the right case half-body 184 and protrudes to the outside of the right case half-body 184 (right side) and the drive pulley (small-diameter pulley) 63 for the right cog belt is fixed to this part. A right endless cog belt 66 is spanned between this right drive pulley 63 and the right driven pulley 51.

The left and right idle gear shafts 193 and 204 exist on the same axis line and the left and right output shafts 194 and 205 also exist on the same axis line. Due to this shaft placement, the left gear train 180 and the right gear train 181 are disposed so as to be juxtaposed in the left-right direction at same-height positions higher than the main wheel 3.

Furthermore, this makes the left and right cog belts 66 have the same length and allows use of one kind of belt as the left and right cog belts 66.

The left and right rotor shafts 64, the output shafts 194 and 205, and the idle gear shafts 193 and 204 are parallel to each other. The idle gear shafts 193 and 204 exist closer to the front side than the rotor shafts 64 and the output shafts 194 and 205 exist below the idle gear shafts 193 and 204. Due to this shaft placement, as shown in FIG. 3, a virtual line L0 linking the center axis lines A, B, and C of these shafts is a hook-shaped line and preferably a bent line convex upward in side view.

As shown in FIG. 3, an upper attaching part 209 located between the left and right first brackets 37 is formed so as to protrude on the rear side of an upper part of the gear case assembly 182, i.e. at an upper part of the side on which the electric motor 61 is attached. In addition, a lower attaching part 210 located between the left and right second brackets 38 is formed so as to protrude at a lower part of the gear case assembly 182 near the output shafts 194 and 205.

The gear case assembly 182 is fixed to the vehicle body frame 2 by a bolt 211 that horizontally penetrates the left and right first brackets 37 and the upper attaching part 209 along the left-right direction and nuts (not shown). In addition, the gear case assembly 182 is fixed to the vehicle body frame 2 by a bolt 212 that horizontally penetrates the left and right second brackets 38 and the lower attaching part 210 along the left-right direction and nuts (not shown).

The bolt 211 horizontally extends along the left-right direction and is parallel to the output shafts 194 and 205. It is located at a position greatly separate from the center axis line of the output shafts 194 and 205 across the electric motors 61. In a state in which fastening of the bolt 211 is loosened, with the bolt 211 serving as a pivot, the gear case assembly 182 can pivot around an axis line parallel to the center axis line of the output shafts 194 and 205. By this pivot of the gear case assembly 182, the center axis line of the output shafts 194 and 205 is displaced in such a direction so as to move closer to or away from the center axis line of the driven pulleys 51 integrated with the drive disks 50, so that the distance between the center axis line of the output shafts 194 and 205 and the center axis line of the drive disks 50 and the driven pulleys 51 increases or decreases.

Bolt through-holes 38A formed in the second brackets 38 are elongated holes that approximate to a circular arc centered at the center axis line of the bolt 212. By fastening of the bolt 212 penetrating through the bolt through-holes 38A, the gear case assembly 182 can be fixed to the vehicle body frame 2 at an arbitrary pivot position in the range of the elongated hole. Tension adjustment of the left and right cog belts 66 can be simultaneously carried out collectively by adjustment of this pivot position of the gear case assembly 182.

Whichever pivot position the gear case assembly 182 exists, the left and right electric motors 61 are disposed at positions directly beneath the rider saddle 84 and the whole thereof is disposed inside the outer contour line of the rider saddle 84 in a plan view. The left and right electric motors 61 are disposed in front of the left and right side posts 21 and protrude to the left and right outside beyond the left and right side posts 21. The left and right drive pulleys 63 are disposed forward and downward of the left and right electric motors 61 and are disposed above the left and right driven pulleys 51. The endless cog belt 66 is spanned between the drive pulley 63 and the driven pulley 51 corresponding to each other on the left or right side. The drive pulley 63 is set so as to have a smaller diameter and a smaller number of teeth than the driven pulley 51. Due to this, the rotational force of the left electric motor 61 is transmitted to the left drive disk 50 via the left gear train 180, the left drive pulley 63, the left cog belt 66, and the left driven pulley 51. Similarly, the rotational force of the right electric motor 61 is transmitted to the right drive disk 50 via the right gear train 181, the right drive pulley 63, the right cog belt 66, and the right driven pulley 51.

A disk-and-belt cover 67 made of a synthetic resin is provided so as to cover the outside of the main wheel 3, the left and right drive disks 50, the left and right driven pulleys 51, the left and right drive pulleys 63, and the left and right cog belts 66. A lower part of the disk-and-belt cover 67 has an opening and a lower part of the main wheel 3 is exposed to the outside through the opening. The disk-and-belt cover 67 is an inner shell disposed inside the outer shell 10.

As shown in FIGS. 1 to 3, the tail wheel unit 6 is supported by the axle 25 with the intermediary of a tail wheel arm 71. The tail wheel arm 71 extends along the front-rear direction. A rear end part thereof extends in a substantially straight line manner whereas the front end side is made as fork parts 72 arising from bifurcation into left and right branches. The main wheel unit 4 (left and right drive disks 50 and main wheel 3), the disk-and-belt cover 67, and the left and right mount members 26 are disposed between the fork parts 72. Tip parts of the fork parts 72 are pivotally supported by both left and right end parts of the axle 25. This allows the tail wheel arm 71 to extend to the rear side of the main wheel 3 without interfering with the main wheel 3, the left and right drive disks 50, and the disk-and-belt cover 67.

The tail wheel unit 6 is supported at the rear end of the tail wheel arm 71. The tail wheel unit 6 has the following components the tail wheel 5 supported rotatably relative to the tail wheel arm 71; an electric motor 73 that rotationally drives the tail wheel 5; a rotational angle sensor 74 that detects the rotational angle of the electric motor 73; and a tail wheel cover 75 that covers the tail wheel 5. Because the tail wheel arm 71 is supported rotatably around the axis line of the axle 25, the tail wheel 5 of the tail wheel unit 6 is grounded by its own weight.

The tail wheel 5 is an omni-wheel composed of a wheel 77 that is supported rotatably relative to the tail wheel arm 71 and has a circular plate shape and a plurality of free rollers 78 spinnably attached to an outer circumferential part of the wheel 77. The free rollers 78 can each rotate with the rotation axis line being the tangent to the wheel 77 at the placement position of the free roller 78. The tail wheel 5 is grounded at the free roller 78. In the state in which the tail wheel 5 is grounded, the rotation axis of the electric motor 73, i.e. the rotation axis line of the wheel 77, extends along the front-rear direction. More specifically, the wheel 77 rotates around an axis line perpendicular to the axis line of the axle 25 (rotation center axis line of the main wheel 3) in plan view.

Stoppers 81 protruding rearward and downward are attached to the left and right side posts 21. The stoppers 81 abut against upper surfaces of the fork parts 72 when the tail wheel arm 71 exists at a predetermined pivot position. This restricts the range of the upward pivot of the tail wheel arm 71 around the axle 25 (the range of the pivot of the tail wheel arm 71 in the anticlockwise direction in the state in which the vehicle is viewed from the left (see FIG. 3)). In other words, the stoppers 81 set the maximum angle of the rearward inclination of the vehicle body frame 2.

As shown in FIG. 3, the electric equipment unit 8 has a main wheel PDU 89, a tail wheel PDU 90, a DC-DC converter (not shown), an I/O interface (not shown), an electric equipment case 44 that houses them and has a flattened rectangular parallelepiped shape, and a gyro sensor 91.

The main wheel PDU 89 is a power drive unit for main wheel control for controlling the drive units 7. It receives an output signal of the gyro sensor 91 and so forth and carries out inverted non-falling control. The tail wheel PDU 90 is a power drive unit for tail wheel control for controlling the tail wheel unit 6. It receives an output signal of the gyro sensor 91 and so forth and carries out turning control. The DC-DC converter steps down a DC voltage supplied from the battery pack 9 to a predetermined DC voltage. The gyro sensor 91 is a posture sensing device that senses the posture of the vehicle body frame 2 and detects the inclination angle and angular velocity of the vehicle body frame (inverted pendulum type vehicle 1) with respect to a predetermined axis line (e.g. vertical line).

The electric equipment case 44 is fastened, by bolts, to the electric equipment unit attaching parts 43 provided on the left and right side posts 21 and is horizontally disposed adjacent to the lower side of the battery case 41 to be described later in a substantially triangular dead space made between a flat bottom surface of the battery case 41 and an arc-shaped upper surface of the main wheel unit 4. Due to this, at a position below the rider saddle 84, most part of the electric equipment case 44 is disposed rearward of the left and right side posts 21 in such a range that the rear end of the case 44 does not protrude rearward beyond the rear end of the rider saddle 84 in side view. The gyro sensor 91 is also mounted on the bottom surface of the electric equipment case 44 in the above-described dead space in such a manner that its rear end does not protrude rearward beyond the rear end of the rider saddle 84 in side view. This placement of the electric equipment case 44 and the gyro sensor 91 allows efficient use of the dead space between the battery case 41 and the main wheel unit 4.

As shown in FIGS. 1 to 3, the battery case 41 is a component that is opened rearward and has a rectangular parallelepiped shape. The upper side of a front part thereof is fixed to the third brackets 39. At a position directly beneath the rider saddle 84, the battery case 41 is horizontally disposed rearward of upper parts of the left and right side posts 21 and at such a position that its rear end does not protrude rearward beyond the rear end of the rider saddle 84 in side view.

The battery case 41, which is horizontally disposed and formed into a rectangular parallelepiped box shape opened rearward, internally has a connector (not shown) for a battery connection. The battery pack 9 has a rectangular parallelepiped shape and is inserted from the rear side into the battery case 41 to thereby be held in the battery case 41 and connected to the connector.

The whole of each of the left and right drive units 7, the battery case 41, and the electric equipment case 44 exists closer to the inside (center side in the vehicle width direction) than virtual lines L1 (see FIG. 4) that link the left and right outermost parts of the rider saddle 84 and the left and right outermost parts of the footstep 101 on the corresponding side, and does not include a part that protrudes to the outside in the vehicle width direction beyond the virtual line L1. In addition, the whole of each of them exists closer to the rear side than a virtual line L2 (see FIG. 1) that links the foremost end of the rider saddle 84 and the foremost end of the footstep 101 and does not include a part that protrudes forward beyond the virtual line L2. Furthermore, the whole of each of them exists closer to the front side than a virtual line L3 (see FIG. 1) that links the rearmost end of the rider saddle 84 and the rear end of the tail wheel unit 6 and does not include a part that protrudes rearward beyond the virtual line L3.

Due to this, even when the inverted pendulum type vehicle 1 falls in the front-rear direction or the left-right direction, the drive units 7, the battery case 41, and the electric equipment case 44 do not abut against the floor surface (ground surface).

The travel operation of the inverted pendulum type vehicle 1 is hereinafter described. The main wheel PDU 89 calculates, as needed, the centroid position of the whole of the inverted pendulum type vehicle 1 including a rider who sits on the rider saddle 84 from change in the inclination angle and angular velocity of the vehicle body frame 2 in the front-rear and left-right directions, calculated by the gyro sensor 91.

When the centroid of the whole of the inverted pendulum type vehicle 1 including the rider exists at the neutral position (e.g. above the axle 25), the main wheel PDU 89 drives the electric motor 61 of the drive unit 7 based on control processing in accordance with the inverted pendulum control rule to keep the vehicle body frame 2 with an upright posture.

At this time, the tail wheel PDU 90 keeps the electric motor 73 of the tail wheel unit 6 at the stopped state based on control processing in accordance with the turning control rule, so that the tail wheel 5 does not rotate.

When the centroid of the whole of the inverted pendulum type vehicle 1 including the rider has moved closer to the front side than the neutral position, the main wheel PDU 89 drives each of the electric motors 61 of the left and right drive units 7 in the forward direction at the same speed under control processing in accordance with the inverted pendulum control rule. By the driving of the electric motors 61, the left and right drive disks 50 rotate forward at the same speed and the main wheel 3 rotates forward, i.e. revolves in the forward movement direction, with the rotation axis being the wheel center of the main wheel 3. At this time, because no rotational speed difference is generated between the left and right drive disks 50, the drive rollers 58 of the drive disks 50 and the driven rollers 54 of the main wheel 3 do not spin and the inverted pendulum type vehicle 1 moves straight forward.

When the centroid of the whole of the inverted pendulum type vehicle 1 including the rider has moved closer to the rear side than the neutral position, the main wheel PDU 89 drives each of the electric motors 61 of the left and right drive units 7 in the reverse direction at the same speed under control processing in accordance with the inverted pendulum control rule. By the driving of the electric motors 61, the left and right drive disks 50 reversely rotate at the same speed and the main wheel 3 reversely rotates, i.e. revolves in the rearward movement direction, with the rotation axis being the wheel center of the main wheel 3. At this time, because no rotational speed difference is generated between the left and right drive disks 50, the drive rollers 58 of the drive disks 50 and the driven rollers 54 of the main wheel 3 do not spin and the inverted pendulum type vehicle 1 moves straight rearward.

In the forward movement and rearward movement, the tail wheel PDU 90 keeps the stopped state of the electric motor 73 of the tail wheel unit 6 under control processing in accordance with the turning control rule, so that the tail wheel 5 does not revolve. At this time, the free roller 78 of the tail wheel 5 spins in association with the forward movement of the inverted pendulum type vehicle 1.

When the centroid of the whole of the inverted pendulum type vehicle 1 including the rider has moved closer to the left side or right side than the neutral position, the main wheel PDU 89 drives the electric motors 61 of the left and right drive units 7 in a rotational directions different from each other or at rotational speeds different from each other under control processing in accordance with the inverted pendulum control rule. A rotational speed difference is generated between the left and right drive disks 50 by the driving of the electric motors 61. Thus, a component force of the orientation orthogonal to the force in the circumferential (tangent) direction of the left and right drive disks 50 based on the rotational force of the drive disks 50 acts on the contact surfaces between the left and right drive rollers 58 and the driven rollers 54 of the main wheel 3. This component force makes the driven rollers 54 rotate (spin) around their own center axis lines.

The rotation of the driven rollers 54 is determined depending on the rotational speed difference between the left and right drive disks 50. For example, when the left and right drive disks 50 are rotated at the same speed in directions opposite to each other, the main wheel 3 does not revolve at all and only the spin of the driven rollers 54 is caused. Due to this, a traveling force in the left-right direction is applied to the main wheel 3 and the inverted pendulum type vehicle 1 moves in the left-right direction (straight lateral movement). When the left and right drive disks 50 are rotated in the same direction at different speeds, the spin of the driven rollers 54 is caused in addition to the revolution of the main wheel 3. This makes the inverted pendulum type vehicle 1 move obliquely forward or obliquely rearward.

At this time, the tail wheel PDU 90 may drive the electric motor 73 of the tail wheel unit 6 based on control processing in accordance with the turning control rule to rotate (revolve) the tail wheel 5 at a rotational speed equivalent to the straight lateral movement speed. If a difference is generated between the amount of movement by the rotation of the driven rollers 54 of the main wheel 3 and the amount of movement by the rotation of the tail wheel 5, the inverted pendulum type vehicle 1 turns.

(1) The left and right drive units 7 having the left and right electric motors 61, the left gear train 180, and the right gear train 181 are disposed so as to be juxtaposed in the left-right direction at same-height positions higher than the main wheel 3 and the left and right drive units 7 and the battery pack 9 are disposed so as to be juxtaposed in front and behind of the vehicle body frame 2. Therefore, the height of the inverted pendulum type vehicle 1 can be suppressed and it becomes easy for a rider to get on and off the vehicle 1 in such a manner as to straddle the main wheel 3 in the left-right direction compared with a case in which the left and right drive units 7 are provided at vertically different levels and a case in which the left and right drive units 7 and the battery pack 9 are disposed so as to be vertically juxtaposed. In particular, by suppressing the height of the vehicle body frame 2, the height of the rider saddle 84 can be set low and thus it also becomes easy for a rider to sit on and dismount the rider saddle 84 in such a manner as to straddle the main wheel 3 in the left-right direction.

(2) The left and right output shafts 194 and 205 of the reduction devices 62 each protrude from the wall part of the gear case assembly 182 on the outside in the vehicle width direction to the outside in the vehicle width direction. Furthermore, the left and right electric motors 61 are each attached to the wall part of the gear case assembly 182 on the outside in the vehicle width direction, i.e. to the same side as the protrusion side of the output shaft 194 or 205 corresponding on the left or right side, and each protrude to the same side as the protrusion side of the output shaft 194 or 205. Therefore, the left and right drive units 7 can be disposed close to each other in the left-right direction (vehicle width direction). This can reduce the vehicle width of the inverted pendulum type vehicle 1 and makes it easy for a rider to get on and off the vehicle 1 in such a manner as to straddle the main wheel 3 in the left-right direction.

(3) The gear case of the left drive unit 7 is formed of the left case half-body 183 and the intermediate case 185 and the gear case of the right drive unit 7 is formed of the right case half-body 184 and the intermediate case 185. This provides a structure in which the gear cases of the left and right drive units 7 are directly connected to each other. Thus, the size of the whole of the gear cases of the left and right drive units 7 in the vehicle width direction can be suppressed to a small size and the number of parts of the gear cases can be reduced compared with a structure in which the gear cases are separate ones in the left and right drive units 7. Furthermore, the rigidity of the connection between the gear cases of the left and right drive units 7 is enhanced and compactification of the gear case assembly 182 is allowed.

(4) In addition, a structure is provided in which the intermediate case 185 allows the left and right drive units 7 to share one wall part as the wall part of the gear case on the inside in the vehicle width direction. Thus, the size of the whole of the gear cases of the left and right drive units 7 in the vehicle width direction can be suppressed to a further smaller size and the number of parts of the gear cases can be reduced. Furthermore, the gear case assembly 182 has a structure in which a partition wall by the intermediate case 185 exists at the intermediate part, which enhances the rigidity of the gear case assembly 182.

(5) With the bolt 211 serving as a pivot, the gear case assembly 182 of the drive units 7 can pivot around an axis line parallel to the center axis line of the output shafts 194 and 205. By this pivot, the center axis line of the output shafts 194 and 205 is displaced in such a direction so as to move closer to or away from the center axis line of the driven pulleys 51 integrated with the drive disks 50, so that the distance between the center axis line of the output shafts 194 and 205 and the center axis line of the drive disks 50 increases or decreases. This allows the tension of the left and right cog belts 66 to be collectively adjusted under the same condition by adjustment of the pivot position of the gear case assembly 182 around the center axis line of the bolt 211.

(6) The gear case assembly 182 is attached to the vehicle body frame 2 pivotally around an axis line parallel to the center axis line of the output shafts 194 and 205 by the bolt 211 and nuts (not shown) at a position separate from the center axis line of the output shafts 194 and 205 across the electric motors 61. Thus, a large distance can be ensured as the distance from the pivot center of the gear case assembly 182 to the output shafts 194 and 205 and the adjustable range of the tension of the cog belts 66 is widened with a small pivot angle.

(7) As shown by virtual lines in FIGS. 1 and 3, lower extremities (legs) M under the knees of a rider sitting on the rider saddle 84 are located forward of the rider saddle 84. In contrast, the electric motors 61 are disposed at positions directly beneath the rider saddle 84. Therefore, although the electric motors 61 are transversely mounted and protrude outward in the vehicle width direction, the lower extremities M of the rider sitting on the rider saddle 84 do not come in contact with the electric motor 61. This provides a comfortable sitting environment. Furthermore, this attributes to enabling the transverse mounting of the electric motors 61 and suppressing the height of the vehicle body frame 2.

(8) The whole of the electric motors 61 is disposed inside the outer contour line of the rider saddle 84 in a plan view. Therefore, although the electric motors 61 are transversely mounted and protrude outward in the vehicle width direction, the lower extremities M of the rider sitting on the rider saddle 84 do not come in contact with the electric motor 61, so that a comfortable sitting environment is achieved.

(9) The electric motors 61 are disposed closer to the inside in the vehicle width direction than the virtual lines L1 linking the outermost points of the rider saddle 84 in the vehicle width direction and the outermost points of the footstep in the vehicle width direction, corresponding to each other on the left and right sides. Thus, even when the inverted pendulum type vehicle 1 laterally falls, the electric motor 61 does not abut against the floor surface (ground surface).

(10) The idle gear shafts 193 and 204 exist closer to the front side than the rotor shafts 64 and the output shafts 194 and 205 exist below the idle gear shafts 193 and 204. Due to this shaft placement, as shown in FIG. 3, the virtual line L0 linking the center axis lines A, B, and C of these shafts is a hook-shaped line. More specifically, a bent line convex upward. This shortens the inter-shaft distance between the rotor shafts 64 and the output shafts 194 and 205. Thus, the anteroposterior length of the reduction devices 62 can be set short compared with the case in which the left and right rotor shafts 64, the output shafts 194 and 205, and the idle gear shafts 193 and 204 are disposed along the front-rear direction in one straight line manner, and the vertical length of the reduction devices 62 can be set short compared with the case in which the left and right rotor shafts 64, the output shafts 194 and 205, and the idle gear shafts 193 and 204 are disposed along the vertical direction in one straight line manner. This can achieve both the advantage that the lower extremities M of the rider sitting on the rider saddle 84 do not come in contact with the reduction device 62 and the advantage that the height of the vehicle body frame 2 is suppressed. Thus, the comfort of the rider can be kept without narrowing the space for the lower extremities M. The amount of protrusion to the outside in the left-right direction is smaller in the idle gear shafts 193 and 204 than in the output shafts 194 and 205. Thus, the degree of influence on the space for the lower extremities M of the rider is low although the idle gear shafts 193 and 204 are disposed upward of the output shafts 194 and 205 so that the virtual line L0 linking the center axis lines A, B, and C of the respective shafts may be a bent line convex upward.

Furthermore, the reduction devices 62 can be disposed closer to the rear side than the virtual line L2 linking the foremost end of the rider saddle 84 and the foremost end of the footstep 101. Thus, even when the inverted pendulum type vehicle 1 falls forward, the reduction devices 62 do not abut against the floor surface (ground surface).

(11) The battery pack 9 is disposed at a position above the main wheel 3 and the electric equipment case 44 that houses the main wheel PDU 89 and the tail wheel PDU 90 is disposed adjacent to the lower side of the battery pack 9. Furthermore, the gyro sensor 91 is disposed in a dead space made between the main wheel 3 and the electric equipment case 44. Therefore, efficient use of the dead space is achieved and the inverted pendulum type vehicle 1 can be made as a compact vehicle.

Although the present invention is described above about the preferred embodiment thereof, the present invention is not limited by such an embodiment and changes can be arbitrarily made without departing from the gist of the present invention, as can be easily understood by those skilled in the art.

For example, the placement of the battery pack 9 and the electric equipment case 44 may be vertically reversed. More specifically, the electric equipment case 44 may be disposed adjacent to the upper side of the battery pack 9. Furthermore, the structure for attaching the drive units 7 to the vehicle body frame 2 in such a manner that the attached position of the drive units 7 relative to the vehicle body frame 2 can be changed in such a direction so as to increase or decrease the distance between the center axis line of the output shafts 194 and 205 and the center axis line of the drive disks 50 may be based on not a pivot system but a slide system.

Furthermore, all the constituent elements shown in the above-described embodiment are not necessarily essential elements and arbitrary choices from them are permitted without departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An inverted pendulum vehicle comprising:
 a vehicle body frame;
 a main wheel including a plurality of freely-rotatable driven rollers wherein a rotational axis lines of the driven rollers form an annular shape;
 a pair of left and right drive disks rotatably supported by the vehicle body frame and located on both left and right sides of the main wheel and to which a plurality of drive rollers disposed in contact with the driven rollers are rotatably freely attached;
 a pair of left and right drive units attached to the vehicle body frame for rotationally driving the left and right drive disks individually under inverted pendulum control; and
 a battery attached to the vehicle body frame for supplying electric power to the pair of drive units;
 a rider riding on the inverted pendulum vehicle in such a manner so as to straddle the main wheel in a left-right direction;
 wherein the pair of drive units are disposed so as to be juxtaposed in the left-right direction at same-height positions higher than the main wheel; and
 the pair of drive units and the battery are disposed so as to be juxtaposed in front and behind respectively, of the vehicle body frame;
 wherein the pair of drive units each have an electric motor, a reduction device that reduces a rotational speed of the electric motor and a reducer case that houses the reduction device;
 output shafts of the reduction devices that output power to the drive disks which protrude from wall parts of the respective reducer cases on opposing outsides in a vehicle width direction so as to extend outwardly in the vehicle width direction; and
 the electric motors are attached to the wall parts of the respective reducer cases on the opposing outsides in the vehicle width direction and protrude from the wall parts outwardly in the vehicle width direction.

2. The inverted pendulum vehicle according to claim 1, wherein constituent parts of the reducer case of the pair of drive units are directly connected to each other.

3. The inverted pendulum vehicle according to claim 2, wherein wall parts of the reducer cases on insides in the vehicle width direction are formed of a common member.

4. The inverted pendulum vehicle according to claim 3, wherein the output shafts of the pair of drive units are disposed on the same axis line in such a manner that a center axis line of the output shafts is parallel to a center axis line of the drive disks, and a power transmission mechanism by transmission belts that transmit rotation of the output shafts to the drive disks is provided, and the drive units are attached to the vehicle body frame in such a manner that an attached position of the drive units relative to the vehicle body frame is changeable in such a direction so as to increase or decrease a distance between the center axis line of the output shafts and the center axis line of the drive disks.

5. The inverted pendulum vehicle according to claim 2, wherein the output shafts of the pair of drive units are disposed on the same axis line in such a manner that a center axis line of the output shafts is parallel to a center axis line of the drive disks, and a power transmission mechanism by transmission belts that transmit rotation of the output shafts to the drive disks is provided, and the drive units are attached to the vehicle body frame in such a manner that an attached position of the drive units relative to the vehicle body frame is changeable in such a direction so as to increase or decrease a distance between the center axis line of the output shafts and the center axis line of the drive disks.

6. The inverted pendulum vehicle according to claim 2, wherein a rider saddle is attached to an upper part of the vehicle body frame and the electric motors are disposed at positions directly beneath the rider saddle.

7. The inverted pendulum vehicle according to claim 2, wherein the reduction devices have drive gears fixed to rotor shafts of the electric motors, driven gears fixed to the output shafts, idle gears for meshing with the drive gears and the driven gears, and idle gear shafts for supporting the idle gears; and the rotor shafts, the output shafts, and the idle gear shafts are parallel to each other and the rotor shafts, the output shafts, and the idle gear shafts are disposed so that a virtual line linking center axis lines of the rotor shafts, the output shafts, and the idle gear shafts is a bent line convex upward.

8. The inverted pendulum vehicle according to claim 1, wherein the output shafts of the pair of drive units are disposed on a same axis line in such a manner that a center axis line of the output shafts is parallel to a center axis line of the drive disks, and a power transmission mechanism by transmission belts that transmit rotation of the output shafts to the drive disks is provided, and the drive units are attached to the vehicle body frame in such a manner that an attached position of the drive units relative to the vehicle body frame is changeable in such a direction so as to increase or decrease a distance between the center axis line of the output shafts and the center axis line of the drive disks.

9. The inverted pendulum vehicle according to claim 8, wherein the drive units are attached to the vehicle body frame pivotally around an axis line parallel to the center axis line of the output shafts at a position separate from the center axis line of the output shafts across the electric motors.

10. The inverted pendulum vehicle according to claim 1, wherein a rider saddle is attached to an upper part of the vehicle body frame and the electric motors are disposed at positions directly beneath the rider saddle.

11. The inverted pendulum vehicle according to claim 10, wherein the electric motors are disposed entirely inside an outer contour line of the rider saddle in plan view.

12. The inverted pendulum vehicle according to claim 11, wherein a rider step is attached below the vehicle body frame; and the electric motors are disposed more inside in the vehicle width direction than left and right virtual lines respectively linking to each other left and right outermost points of the rider saddle in the vehicle width direction and left and right outermost points of the rider step in the vehicle width direction.

13. The inverted pendulum vehicle according to claim 10, wherein a rider step is attached below the vehicle body frame; and the electric motors are disposed more inside in the vehicle width direction than left and right virtual lines, respectively linking to each other left and right outermost points of the rider saddle in the vehicle width direction and left and right outermost points of the rider step in the vehicle width direction.

14. The inverted pendulum vehicle according to claim 1, wherein the reduction devices have drive gears fixed to rotor shafts of the electric motors, driven gears fixed to the output shafts, idle gears for meshing with the drive gears and the driven gears, and idle gear shafts for supporting the idle gears; and the rotor shafts, the output shafts, and the idle gear shafts are parallel to each other and the rotor shafts, the output shafts, and the idle gear shafts are disposed so that a virtual line linking center axis lines of the rotor shafts, the output shafts, and the idle gear shafts is a bent line convex upward.

15. The inverted pendulum vehicle according to claim 1, wherein the battery is disposed at a position above the main wheel;

a power drive unit for controlling electric power supplied from the battery to the drive units is disposed adjacent to an upper side or a lower side of the battery; and a posture sensing device for sensing posture of the vehicle body frame for the inverted pendulum control is disposed in a space formed between the main wheel and the battery or the power drive unit.

16. An inverted pendulum vehicle comprising:
a vehicle body frame;
a main wheel including a plurality of freely-rotatable driven rollers wherein a rotational axis lines of the driven rollers form an annular shape;
a pair of left and right drive disks rotatably supported by the vehicle body frame and located on both left and right sides of the main wheel and to which a plurality of drive rollers disposed in contact with the driven rollers are rotatably freely attached;
a pair of left and right drive units attached to the vehicle body frame for rotationally driving the left and right drive disks individually under inverted pendulum control;
and a battery attached to the vehicle body frame for supplying electric power to the pair of drive units;
a rider riding on the inverted pendulum vehicle in such a manner so as to straddle the main wheel in a left-right direction;

wherein the pair of drive units are disposed so as to be juxtaposed in the left-right direction at same-height positions higher than the main wheel;

the pair of drive units and the battery are disposed so as to be juxtaposed in front of the vehicle body frame; and wherein the battery is disposed at a position above the main wheel;

a power drive unit for controlling electric power supplied from the battery to the drive units is disposed adjacent to an upper side or a lower side of the battery; and a posture sensing device for sensing posture of the vehicle body frame for the inverted pendulum control is disposed in a space formed between the main wheel and the battery or the power drive unit.

17. An inverted pendulum vehicle comprising:

a vehicle body frame;

a main wheel including a plurality of freely-rotatable driven rollers wherein a rotational axis lines of the driven rollers form an annular shape;

a pair of left and right drive disks rotatably supported by the vehicle body frame and located on both left and right sides of the main wheel and to which a plurality of drive rollers disposed in contact with the driven rollers are rotatably freely attached;

a pair of left and right drive units attached to the vehicle body frame for rotationally driving the left and right drive disks individually under inverted pendulum control; and wherein the pair of drive units are disposed so as to be juxtaposed in the left-right direction at same-height positions higher than the main wheel;

the pair of drive units is disposed so as to be juxtaposed in front of the vehicle body frame;

wherein the pair of drive units each have an electric motor, a reduction device that reduces a rotational speed of the electric motor and a reducer case that houses the reduction device;

output shafts of the reduction devices that output power to the drive disks protrude from wall parts of the respective reducer cases on the opposing outsides in a vehicle width direction so as to extend outward in the vehicle width direction; and the electric motors are attached to the wall arts of the respective reducer cases on the opposing outsides in the vehicle width direction and protrude from the wall parts outwardly in the vehicle width direction.

18. The inverted pendulum vehicle according to claim 17, wherein constituent parts of the reducer case of the pair of drive units are directly connected to each other.

* * * * *